United States Patent [19]
Ashihara

[11] Patent Number: 5,905,458
[45] Date of Patent: May 18, 1999

[54] FM RADAR APPARATUS

[75] Inventor: Jun Ashihara, Wako, Japan

[73] Assignee: Honda Giken Kogyo Kabushiki Kaisha, Tokyo, Japan

[21] Appl. No.: 08/974,013

[22] Filed: Nov. 19, 1997

[30] Foreign Application Priority Data

Nov. 19, 1996 [JP] Japan ..................................... 8-308440

[51] Int. Cl.$^6$ .............................. G01S 13/42; G01S 13/60
[52] U.S. Cl. ............................ 342/70; 342/109; 342/111; 342/112; 342/196
[58] Field of Search ................................. 342/70, 71, 72, 342/109, 111, 112, 115, 116, 128, 129, 192, 196

[56] References Cited

U.S. PATENT DOCUMENTS

| | | | |
|---|---|---|---|
| 5,274,380 | 12/1993 | Yatsuka et al. ........................... | 342/70 |
| 5,448,244 | 9/1995 | Komatsu et al. ........................ | 342/155 |
| 5,619,208 | 4/1997 | Tamatsu et al. .......................... | 342/70 |
| 5,731,778 | 3/1998 | Nakatani et al. ........................ | 342/70 |
| 5,757,307 | 5/1998 | Nakatani et al. ........................ | 342/70 |

FOREIGN PATENT DOCUMENTS

| | | |
|---|---|---|
| 2-264816 | 10/1990 | Japan . |
| 3-317791 | 12/1991 | Japan . |
| 4-159949 | 5/1992 | Japan . |
| 5-51443 | 2/1993 | Japan . |
| 5-142337 | 6/1993 | Japan . |
| 07128440 | 5/1995 | Japan . |
| 08211145 | 8/1996 | Japan . |

*Primary Examiner*—John B. Sotomayor
*Attorney, Agent, or Firm*—Lyon & Lyon LLP

[57] ABSTRACT

An FM radar apparatus detects a distance to and/or a speed of a target not only from peak frequencies of beat signals in respective frequency rise and fall regions but also by reusing the peak frequency in the preceding frequency rise or fall region. As a result, it becomes possible to obtain target data at twice the conventional pitch and hence to detect the target more finely and minutely.

14 Claims, 13 Drawing Sheets

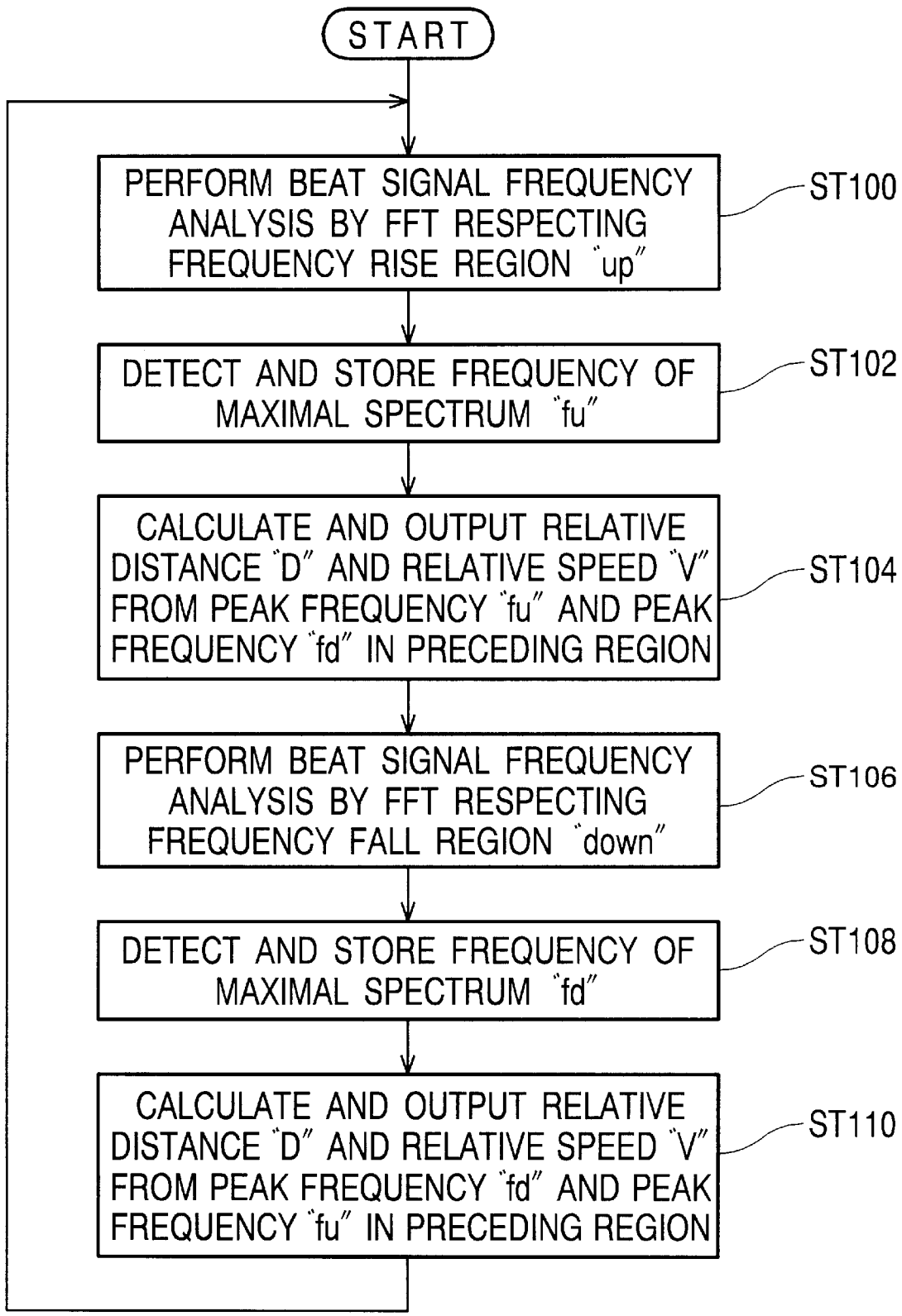

FM RADAR APPARATUS

BACKGROUND OF THE INVENTION

1. Field of the Invention

This invention relates generally to a radar apparatus for detecting a target. More particularly, it relates to an FM radar apparatus for detecting a target on the basis of a beat signal (frequency deviation between transmitted and received signals) obtained by mixing a transmitted signal of FM wave with frequency varying with time, and a received signal of reflected wave from the target.

2. Description of the Related Art

FM radar apparatuses, which transmit and receive frequency modulated (FM) signals and detect a target on the basis of a beat signal obtained by mixing transmitted and received signals, are known from, for example, Japanese Patent Laid-Open Publication No. HEI 5-180931, Japanese Patent Laid-Open Publication No. HEI 8-211145, Japanese Patent Laid-Open Publication No. HEI 7-128440, Japanese Patent Laid-Open Publication No. HEI 6-242230, Japanese Patent Laid-Open Publication No. HEI 4-142486, Japanese Patent Laid-Open Publication No. HEI 5-142337 and Japanese Patent Laid-Open Publication No. HEI 5-150035.

In Japanese Patent Laid-Open Publication Nos. HEI 5-142337 and HEI 5-150035, there are disclosed FM radar apparatuses in which a beat signal is subjected to a frequency analysis using a Fast Fourier transform (FFT) to provide a plurality of peak frequencies, and a distance to and a speed of a target are detected based on the peak frequencies in each of frequency rise and fall regions of a frequency modulated triangular wave (frequency rise and fall domains of FM signal).

In these publications, there are also disclosed an arithmetic operation in which the sum of and difference between the peak frequencies in the rise and fall domains of the beat signal are divided by two to thereby detect the distance and speed. Another arithmetic operation is also disclosed which may be used to detect a relative distance and a relative speed with respect to the target. Herein-below, these arithmetic operations will jointly be called "Doppler shift calculation".

The above two publications teach detection of the distance to and speed of the target from the peak frequencies of the beat signals in the frequency rise region domain and the succeeding frequency fall domain. Other-wise, the distance (relative distance) and speed (relative speed) are detected from the peak frequencies of the beat signals in the frequency fall region and the succeeding frequency rise region.

In the conventional FM radar apparatus thus arranged, the distance and speed data relative to the target can be obtained at each cycle of frequency sweep of the frequency rise region and frequency fall region in combination. However, for detecting the target in more detail, it is necessary to obtain data relative to (at least one of the distance and speed of) the target at an accelerated pitch.

SUMMARY OF THE INVENTION

According to a first aspect of the present invention, there is provided an FM radar apparatus which comprises a detector for detecting at least one of a distance to and a speed of a target from peak frequencies of beat signals in a frequency rise region and a succeeding frequency fall region of an FM signal, and a separate detector for redetecting at lest one of the distance and the speed from the peak frequency in the frequency fall region and a peak frequency of a beat signal in a succeeding frequency rise region of the FM signal.

In the FM radar apparatus thus arranged, by repeating the detection of the distance and/or speed of the target from the peak frequencies of the beat signals in the frequency rise region and the succeeding frequency fall region and the detection of the distance and/or the speed of the target from the peak frequencies of the beat signals in the frequency fall region and the succeeding frequency rise region, it becomes possible to obtain target data at twice the pitch of the conventional one, thereby enabling finer and more minute detection of the target.

Since the peak frequency in the immediately preceding frequency fall region is reused in detecting the distance and/or speed of the target, it becomes possible to save time and labor which are otherwise required in once again frequency analyzing the beat signal in the preceding frequency region so as to obtain the respective peak frequency. This further enables to keep the load increase, such as high speed operational processing to be involved in accelerating the pitch of detection, to a minimum.

In one preferred form of the invention, the FM radar apparatus allows for switching of the directions of beam transmission upon shifting from the frequency rise region to a succeeding frequency fall region of the FM signal and upon shifting from the frequency fall region to a succeeding frequency rise region of the FM signal, and includes a size detector for detecting the size of the target in the directions of beam transmission, from a spectrum level in the peak frequency of the beat signal in each of the regions. Consequently, target data can be obtained at an accelerated pitch or frequency during beam scanning, thus improving the bearing resolution and enabling more detailed detection of the target. Such signal processing is particularly effective in scanning beams continuously through a mechanical scanning employing a motor.

Switching of the directions of beam transmission may be either upon shifting from the frequency rise region to the succeeding frequency fall region of the FM signal, or upon shifting from the frequency fall region to the succeeding frequency rise region of the FM signal. That is, the directions of beam transmission may be changed at each cycle of frequency sweep. More specifically, in the arrangement in which the directions of beam transmission are switched upon shifting from the frequency rise region to the succeeding frequency fall region, the directions of beam transmission remain constant between the start of the frequency fall region and the end of the succeeding frequency rise region. Similarly, the directions of beam transmission remain constant between the start of the next frequency fall region and the end of the succeeding frequency rise region but are switched to different directions. With this arrangement, it becomes possible to detect the distance to and the speed of the target located across both directions of beam transmission occurring before and after shifting of the frequency region. This further provides improved bearing resolution without increasing an angular velocity in scanning directions and frequency sweep speed, thus leading to target detection improved in detection accuracy.

Similarly, in the arrangement in which the directions of beam transmission are switched upon shifting from the frequency fall region to the frequency rise region, it is possible to detect the distance to and speed of the target located in the directions of transmission of both beams. As a result, such arrangement also provides improved bearing resolution without increasing the angular velocity in scanning directions and frequency sweep speed, thus leading to target detection with improved accuracy.

In a preferred form of the invention, the FM radar apparatus allows for switching of the directions of beam transmission upon shifting from the frequency rise region to a succeeding frequency fall region of the FM signal and upon shifting from the frequency fall region to a succeeding frequency rise region of the FM signal, and includes a size detector for detecting the size of the target located in the directions of beam transmission, from a spectrum level in the peak frequency of the beat signal in each of the regions. Consequently, accuracy in the detection of the target is significantly improved compared to the conventional arrangement in which the target size detection is carried out based on an average, obtained at each cycle of frequency sweep, of spectrum levels of the peak frequencies in the frequency rise and fall regions.

According to a second aspect of the present invention, there is provided an FM radar apparatus which comprises a detector for detecting a distance to and/or a speed of a target from peak frequencies of beat signals in a frequency fall region and a succeeding frequency rise region of an FM signal, and a separate detector for redetecting the distance and/or speed from the peak frequency of the beat signal in the frequency rise region and a peak frequency of a beat signal in a succeeding frequency fall region of the FM signal.

In the FM radar apparatus thus arranged, by repeating the detection of the distance and/or speed of the target from the peak frequencies of the beat signals in the frequency rise region and the succeeding frequency fall region and the detection of the distance and/or speed of the target from the peak frequencies of the beat signals in the frequency fall region and the frequency rise region, it becomes possible to obtain target data at twice the pitch of the conventional one, thereby enabling finer and more minute detection of the target.

Since the peak frequency in the immediately preceding frequency fall region is reused in detecting the distance and/or speed of the target, it becomes possible to save time and labor which are otherwise required in once again frequency analyzing the beat signal in the preceding frequency region so as to obtain the respective peak frequency. This further makes it possible to keep the load increase, such as high speed operational processing involved in accelerating the pitch of detection, to a minimum.

According to a third aspect of the present invention, there is provided an FM radar apparatus for sequentially transmitting beams of an FM signal in a plurality of directions lying proximately to each other, receiving a reflected signal from a target located in the directions of beam transmission, and detecting the target based on a beat signal obtained by mixing the received signal with a signal relating to the transmitted signal, wherein the FM radar apparatus allows for switching of the directions of beam transmission upon shifting from the frequency rise region to a succeeding frequency fall region of the FM signal and upon shifting from the frequency fall region to a succeeding frequency rise region of the FM signal, and includes a size detector for detecting the size of the target in the directions of beam transmission, from a spectrum level in the peak frequency of the beat signal in each of the regions.

In the FM radar apparatus thus arranged, the size of the target in each direction of beam transmission can be detected from a spectrum level in the peak frequency of the beat signal in each frequency region. As a result, it becomes possible to detect the configuration of the target with improved accuracy compared to the conventional case wherein the size of the target is detected from an average, obtained at each cycle of frequency sweep, of spectrum levels of the peak frequencies in the frequency rise and fall regions.

Desirably, the FM radar apparatus comprises an FM-CW radar apparatus for transmitting an FM signal frequency modulated by a triangular wave. As a result, it becomes possible to detect, though a simple arithmetic operation, the distance to and speed of the target from the peak frequency of the beat signal.

BRIEF DESCRIPTION OF THE DRAWINGS

Certain preferred embodiments of the present invention will hereinafter be described in detail, by way of example only, with reference to the accompanying drawings, in which:

FIG. 2 is a flowchart showing an important operation of a signal processing unit according to the present invention;

FIGS. 9A, 9B and 9C are flowcharts illustrating the separate operation of the signal processing unit of FIG. 7B.

DETAILED DESCRIPTION OF THE PREFERRED EMBODIMENT

The following description is merely exemplary in nature and is in no way intended to limit the invention or its application or uses.

Figure 1:
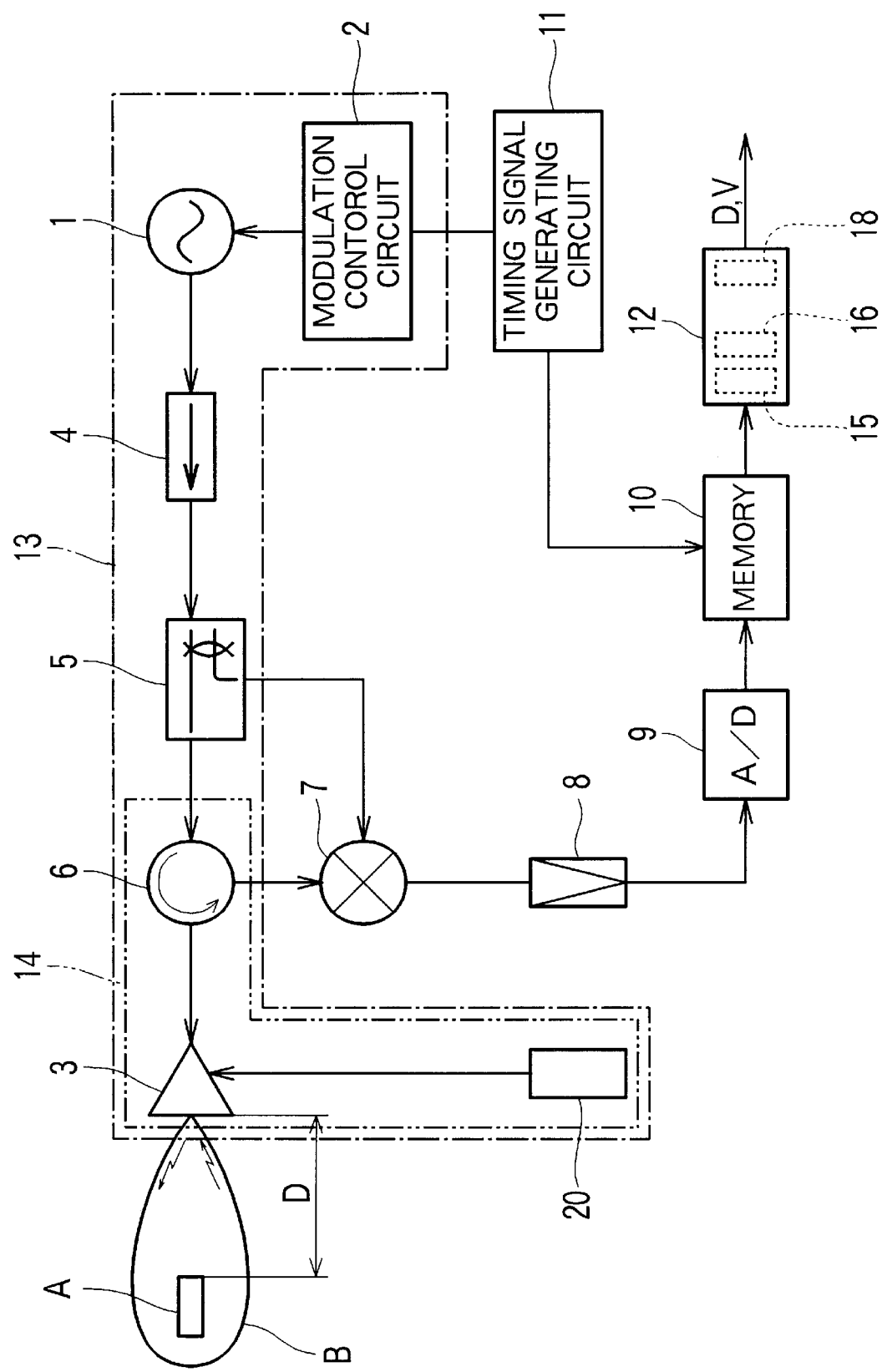
FIG. 1 is a block diagram illustrating an FM radar apparatus according to one embodiment of the present invention.

An FM radar apparatus in accordance with the present invention is mounted, for example, on an automobile. In FIG. 1, reference numeral 1 designates an oscillator for generating an FM signal (to be transmitted). Designated by reference numeral 2 is a modulation control circuit for controlling the timed modulation of the frequency of the FM signal generated by the oscillator 1. Reference numeral 3 designates an antenna for transmitting in a predetermined direction an electromagnetic wave beam B of frequency equal to that of the FM signal, in correspondence to the FM signal provided from the oscillator 1 through an isolator 4, a directional coupler 5 and a circulator 6, and for receiving a reflected wave of the transmitted electromagnetic wave beam B. Reference numeral 7 denotes is a mixer for part of the transmitted signal distributed and input via the directional coupler 5 with a received signal input from the antenna 3 via the circulator 6 to produce a beat signal having a frequency equivalent to the time-caused frequency difference or deviation between the two signals. Designated by reference numeral 8 is an amplifier for amplifying the beat signal generated by the mixer 7 to a required level. Reference numeral 9 denotes an A/D converter for effecting A/D conversion of the beat signal amplified by the amplifier 8. Reference numeral 10 designates a memory for storing in time series the beat signal A/D converted by the A/D converter 9 in accordance with a timing signal fed from a timing signal generating circuit 11 associated with the modulation control circuit 2. Reference numeral 12 designates a signal processing unit which calculates and processes data of the beat signal stored in the memory 10 to provide a relative distance D between a vehicle carrying the radar apparatus (hereinafter called "present vehicle") and a target A such as a separate vehicle located in the direction of transmission of the electromagnetic wave beam B, as well as a relative speed or velocity V therebetween. Reference numeral 20 denotes a motor for use in mechanically scanning the electromagnetic wave beam B continuously.

The oscillator 1, modulation control circuit 2, isolator 4, directional coupler 5, circulator 6, antenna 3 and motor 20 jointly form a transmitter 13. Similarly, the circulator 6, antenna 3 and motor 20 jointly form a receiver 14. The mixer 7 also acts as a beat signal generator.

The signal processing unit 12 is comprised of an electronic circuit including a microcomputer and so forth. To perform its inherent functions, it includes a frequency analyzer 15, a maximal spectrum detector 16 and a distance/speed detector 18.

Operation of the above-described FM radar apparatus will now be explained in conjunction with detailed portions of the apparatus.

In the FM radar apparatus of the first embodiment shown in FIG. 1, the FM signal generated by the oscillator 1 is controlled in its frequency by the modulation control circuit 2. The frequency of the FM signal is modulated such that it periodically increases and decreases linearly between frequencies fx and fy (fx<fy). That is, it is modulated into a triangular wave. The FM signal thus modulated is fed through the isolator 4, directional coupler 5 and circulator 6 to the antenna 3, where it is transmitted as the electromagnetic wave beam B having a modulated frequency identical to that of the FM signal. At this time, the the electromagnetic wave beam B has directivity and is transmitted frontwardly of the vehicle. The directivity varies continuously by the motor 20 so that the electromagnetic wave beam B can be scanned.

Upon transmission of the electromagnetic wave beam B, if there is a target A such as another vehicle in the direction of beam transmission, the beam B is reflected by the target A and is then received by the antenna 3. The reflected wave or received signal is input to the mixer 7 via the circulator 6. The mixer 7 is already fed, via the directional coupler 5, with part of the FM signal (transmitted signal) output from the oscillator 1 and thus mixes it with the received signal.

The received signal, now modulated into a triangular wave like the transmitted signal, experiences a delay in time $\tau$ with respect to the transmitted signal, which is required for the electromagnetic wave to make a round trip between the present vehicle and the target A. Comparison of the transmitted signal and received signal on the same time axis reveals that there arises a time-caused frequency difference fb, corresponding to the delay time $\tau$ of the received signal, between the frequencies of the two signals. Thus, mixing of the transmitted and received signals by the mixer 7 produces a beat signal having a frequency of the time-caused frequency difference fb.

Since the frequency of the received signal produces a Doppler shift with respect to the transmitted signal when the target A is moving with respect to the present vehicle, a relative distance D and a relative speed V between the present vehicle and the target A can be detected with accuracy by a Doppler shift calculation. This is the basic principle of an FM-CW radar apparatus which the FM radar apparatus according to the present embodiment employs.

When, for example, one target A exists in the direction of transmission of the electromagnetic wave beam B as shown in FIG. 1, the frequency distribution (spectrum distribution) of the beat signal occurs such that a spectrum level becomes maximal in the frequency f1 corresponding to the relative distance D where the relative speed V is small. The spectrum distribution in a region proximate to the frequency f1 occurs such that the spectrum level generally decreases symmetrically on both sides of the frequency f1 as a peak. The spectrum level in the frequency f1 is equivalent to the reception level of that portion of the reflected electromagnetic wave which is received directly by the antenna 3.

The beat signal generated by the mixer 7 is amplified by the amplifier 8 to one of required amplitude level. It is then A/D converted at each sampling time by the A/D converter 9, whereafter the resulting amplitude data of the digitized beat signal are stored in time series in the memory 10. In this instance, the memory 10 keeps the amplitude data of the beat signal in time series for a predetermined period of time in accordance with a timing signal fed from the timing signal generating circuit 11. For example, it retains the beat signal amplitude data for a period of time in which the frequencies of the transmitted and received waves both increase or decrease.

Now, on the basis of the data stored in the memory 10, the relative distance D and relative speed V between the vehicle and the target A are obtained by the signal processing unit 12 from a peak frequency fu (up) in a frequency rise region or domain and a peak frequency fd (down) in a frequency fall region or domain.

Referring now to FIG. 2, at Step (hereafter abbreviated to ST) 100, the signal processing unit 12 firstly performs a frequency analysis by the frequency analyzer 15 on the beat signal data stored in the memory 10 so as to obtain a spectrum distribution thereof. In this instance, the frequency analyzer 15 obtains the spectrum distribution of the beat signal by the Fast Fourie transform (FFT), an arithmetic process for frequency analysis.

In the frequency analysis, a plurality of spectrum data are obtained in each predetermined unit frequency interval $\Delta f$ of the frequency of the beat signal. The unit frequency interval $\Delta f$ is equivalent to the frequency resolution of the FM radar apparatus according to the present embodiment.

By the maximal spectrum detector 16, the signal processing unit 12 detects, based on the spectrum data, a spectrum with a spectrum level of maximal value higher than a predetermined level or a threshold (hereinafter called "maximal spectrum) (ST 102). Detection is performed, for example, with respect to spectra each having a spectrum level higher than the threshold and being on an increasing and decreasing trend to determine the maximal spectrum therebetween. The threshold is set to exclude noise components from the spectrum data of the beat signal. The frequency of the thus obtained maximal spectrum is stored as a peak frequency in an internal memory of the signal processing unit 12 (ST 102).

The distance/speed detector 18 of the signal processing unit 12 performs a Doppler shift calculation to produce a relative distance D and a relative speed V with respect to the target A at the frequency of one half the modulation cycle from a peak frequency fu (up) in a frequency rise region or domain and a peak frequency fd (down) in a succeeding frequency fall region or domain. In short, the relative distance D and relative speed V are produced from the peak frequency fu and the peak frequency fd in the immediately preceding domain (ST 104).

Next, concerning the frequency fall region "down", frequency analysis is conducted in a manner similar to that of ST 100, on the data of the beat signal stored in the memory 10, using the frequency analyzer 15, so as to obtain a spectrum distribution thereof (ST 106). In ST 108, a spectrum having a spectrum level of maximal value larger than a given level (threshold) (hereinafter called "maximal spectrum") is detected on the basis of the spectrum data via the maximal spectrum detector 16 and store in the internal memory of the signal processing unit 12. In ST 110, the distance/speed detector 18 carries out a Doppler shift calculation to produce a relative distance D and a relative speed V with respect to the target A at the frequency of one half the modulation cycle from the peak frequency fd (down) in the frequency fall domain and the peak frequency fu (up) in the succeeding frequency rise domain of the FM signal. In short, the relative distance D and relative speed V are obtained from the peak frequency fd and peak frequency fu in the immediately preceding domain. The thus obtained relative distance D and relative speed V are output to, e.g., an automatic driving control system (not shown). In the FM radar apparatus according to the present embodiment, the just described operation is repeated periodically.

Figure 3A:
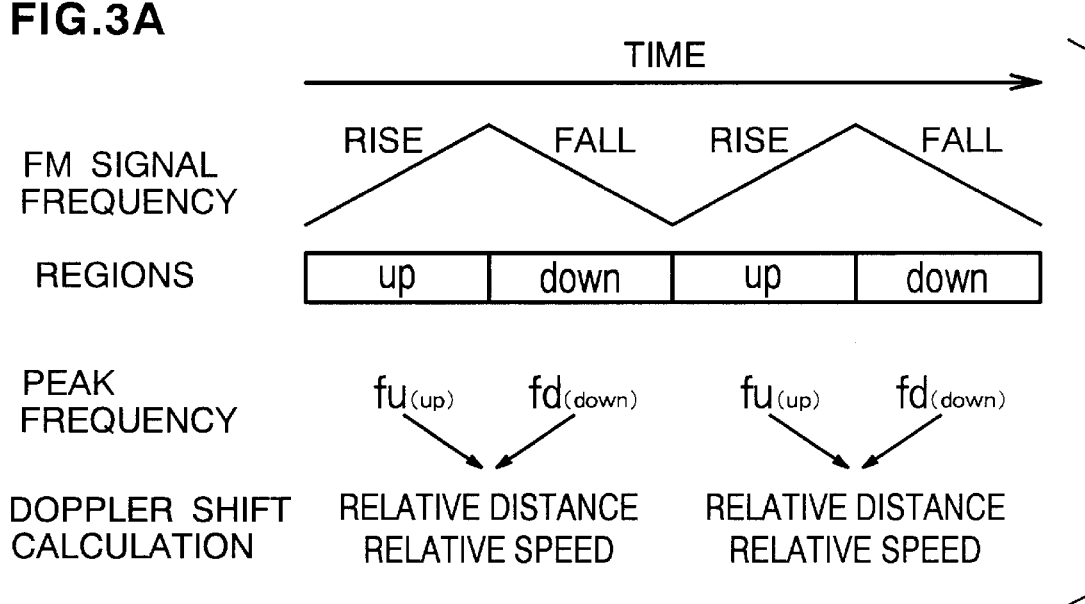
FIGS. 3A and 3B are explanatory views illustrating an operation of the inventive radar apparatus as compared to that of a conventional radar apparatus.
Figure 3B:
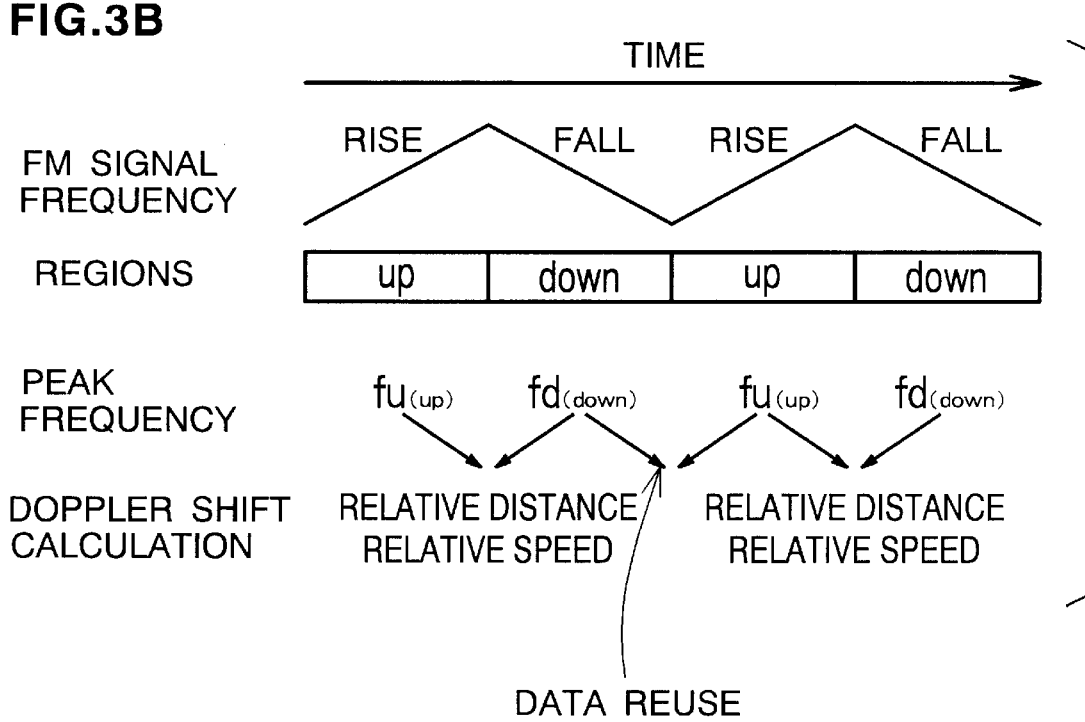

FIG. 3A shows an operation of a conventional FM radar apparatus, whilst FIG. 3B shows an operation of the inventive FM radar apparatus in a contrasted manner.

In the conventional FM radar apparatus of FIG. 3A, a relative distance D and a relative speed V with respect to a target A are obtained through a Doppler shift calculation from a peak frequency fu (up) in a frequency rise region and a peak frequency fd (down) in a succeeding frequency fall region. This is repeated in each frequency sweep cycle. In other words, in the conventional FM radar apparatus, the Doppler shift calculation is deferred until peak frequency data of both rise and fall regions become available, thereby prolonging an output cycle.

By contrast, in the inventive FM radar apparatus of FIG. 3B, the relative distance D and relative speed V with respect to the target A are obtained through the Doppler shift calculation not only from a peak frequency fu (up) in a frequency rise region in combination with a peak frequency fd (down) in a succeeding frequency fall region, but also from the peak frequency fd (down) in the frequency fall region in combination with a peak frequency fu (up) in a succeeding frequency rise region. By thus detecting the relative distance D and relative speed V from respective peak frequencies in one region and another preceding it, it becomes possible to obtain data relative to the target A in an accelerated pitch compared to the conventional FM radar apparatus. This means that the target A can be detected more finely and minutely. The conventional FM radar apparatus also employs the method of detecting peak frequencies by frequency analyzing beat signals in respective rise and fall regions in combination. However, in the present invention, peak frequencies in any preceding regions are reused in the following pitch of processing or cycle of detection, thereby negating the necessity to once again frequency analyze the beat signals in the preceding regions in the succeeding pitches or cycles of detection. This also leads to the advantage that increase of load such as high speed operational processes involved in accelerated pitches of detection can be kept to a minimum. Such signal processing improves, jointly with the mechanical continuous scanning of the electromagnetic beam B, the resolution of the target in bearing directions.

Figure 4:
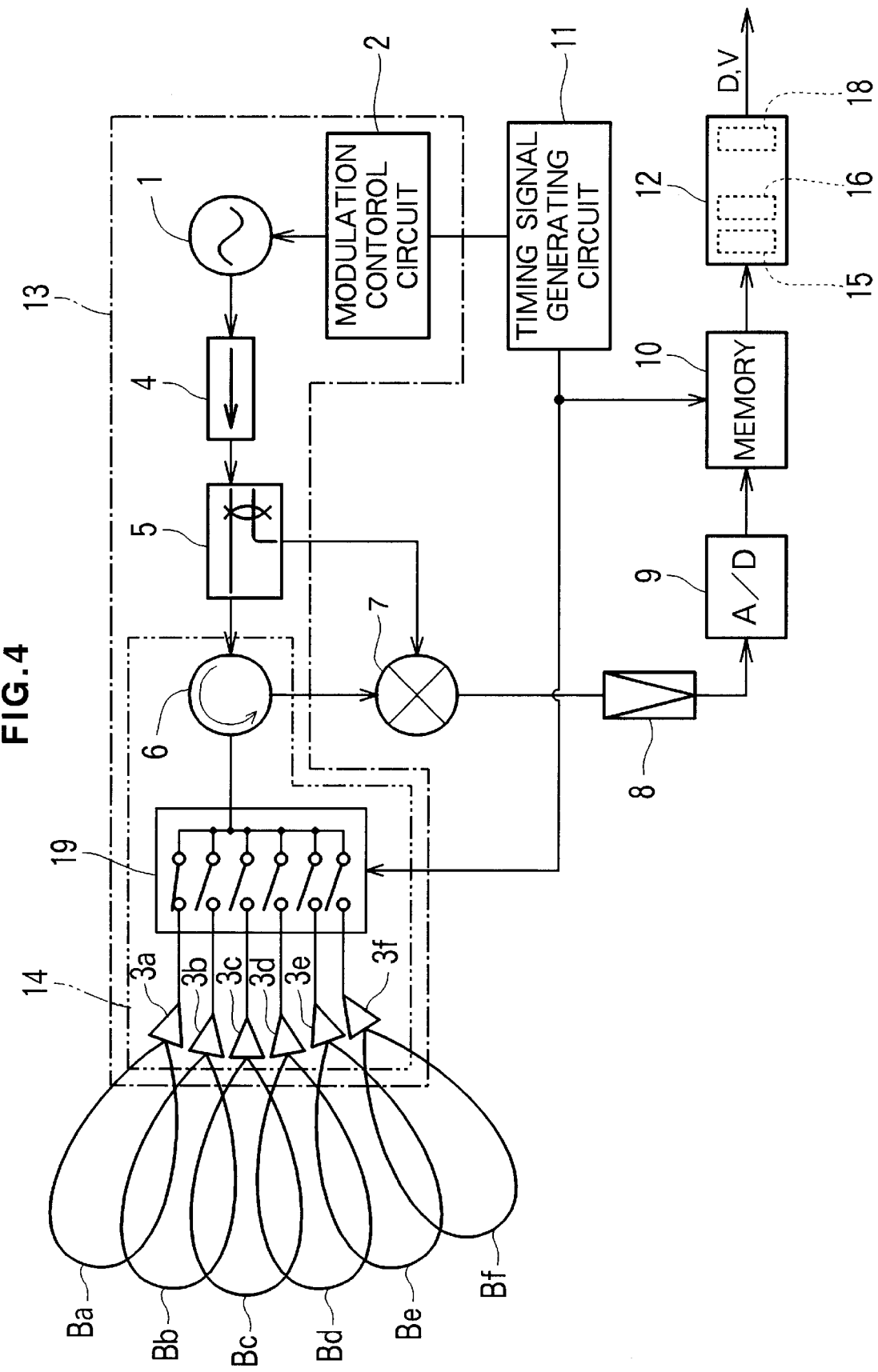
FIG. 4 is a block diagram illustrating an FM radar apparatus according to another embodiment of the present invention.

Reference is now had to FIG. 4 showing in block diagram an FM radar apparatus according to a separate embodiment of the present invention.

The FM radar apparatus according to the separate embodiment is designed to detect the two-dimensional relative position of a target A such as another vehicle located forwardly of the present vehicle carrying the radar apparatus. Similarly to the one of the embodiment shown in FIG. 1, the FM radar apparatus comprises an oscillator 1, a modulation control circuit 2, an isolator 4, a directional coupler 5, a circulator 6, a mixer 7, an amplifier 8, an A/D converter 9, a memory 10, a timing signal generating circuit 11 and a signal processing unit 12. This arrangement is generally identical to that of the FM radar apparatus of the embodiment shown in FIG. 1.

The FM radar apparatus according to this embodiment also includes a plurality of (in this embodiment, six) antennas 3a–3f for transmitting and receiving electromagnetic waves, and a switching device 19 disposed between the antennas 3a–3f and the circulator 6 for selectively switching the antennas 3a–3f sequentially.

Oscillator 1, modulation control circuit 2, isolator 4, directional coupler 5, circulator 6, switching device 19 and antennas 3a–3f jointly form a transmitter 13 while the antennas 3a–3f, switching device 19 and circulator 6 jointly form a receiver 14. The mixer 7 functions as a beat signal generator.

The signal processing unit 12 comprises an electronic circuit including, for performing its functions, a frequency analyzer 15, a maximal spectrum detector 16 and a distance/speed detector 18.

Next, discussion will be made as to operation of the FM radar apparatus according to the embodiment just described, and as to the detailed portions thereof.

The frequency-modulated FM signal (transmission signal) output from the oscillator 1 is supplied to the switching device 19 via the isolator 4, directional coupler 5 and circulator 6.

In response to a timing signal output from the timing signal generating circuit 11 associated with the modulation control circuit 2, the switching device 19 operates to switch the antennas 3a–3f connected to the circulator 6 selectively sequentially in timed relation to one-half of a modulation cycle of the FM signal (that is, at transition from a frequency rise region to a frequency fall region).

Each antenna 3a–3f is connected via the switching device 19 to the circulator 6 sequentially with a delay of time equivalent to one-half of the modulation cycle of the FM signal and is thus fed with the FM signal. When fed with the FM signal, each antenna 3a–3f transmits an electromagnetic wave beam Ba–Bf. At this time, the antennas 3a–3f are disposed closely to each other and have directivity positioned closely but oriented differently from each other. The electromagnetic wave beam Bc corresponding to the antenna 3c, for example, is transmitted straightforwardly of the present vehicle. The electromagnetic wave beams Bb, Ba corresponding to the antennas 3b, 3a are transmitted in directions slightly displaced rightward (upward in FIG. 4) by a predetermined angle from the electromagnetic wave beam Bc. The electromagnetic wave beams Bd, Be, Bf corresponding to the antennas 3d, 3e, 3f are transmitted in directions slightly displaced leftward (downward in FIG. 4) by a predetermined angle from the electromagnetic wave beam Bc.

Upon transmission of the electromagnetic wave beams Ba–Bf, the respective antenna 3a–3f receives a reflected wave if there is a target A such as another vehicle located in the direction of transmission of the electromagnetic wave beams Ba–Bf. The received signal is fed to the mixer 7 via the switching device 19 and the circulator 6.

Mixer 7 mixes the received signal corresponding to the respective electromagnetic wave beam Ba–Bf, with part of the transmission signal to thereby produce a beat signal corresponding to the target A located in the direction of transmission of the electromagnetic wave beams Ba–Bf. By selectively switching the electromagnetic wave beams Ba–Bf sequentially, the beat signal is sequentially generated with a time difference or delay equal to one-half of the modulation cycle of the FM signal (transmission signal) for each electromagnetic wave beam Ba–Bf.

The amplitude data of the beat signal corresponding to the electromagnetic wave beam Ba–Bf are stored in time series in the memory 10 via the amplifier 8 and/or the A/D converter 9. At this time, the memory 10 stores the data of the beat signals corresponding to the electromagnetic wave beams Ba–Bf separately from each other. That is, there are six different kinds of beat signal data relating to the electromagnetic wave beams Ba–Bf in the memory 10. Alternatively, arrangements may be made such that electromagnetic wave beam Ba is transmitted next after the electromagnetic wave beam Bf and that the stored beat signal data are updated at the frequency of three times the modulation cycle.

Based on the beat signal data for each electromagnetic wave beams Ba–Bf stored in the memory 10, the signal processing unit 12 produces the relative distance D from the present vehicle to the target A and the relative speed V therebetween.

Discussion will now be made as to a case wherein the target A is located in the direction of or across the transmitted electromagnetic wave beams Ba–Bf, with reference to the flowcharts of FIGS. 5A–5B.

Figure 5A:
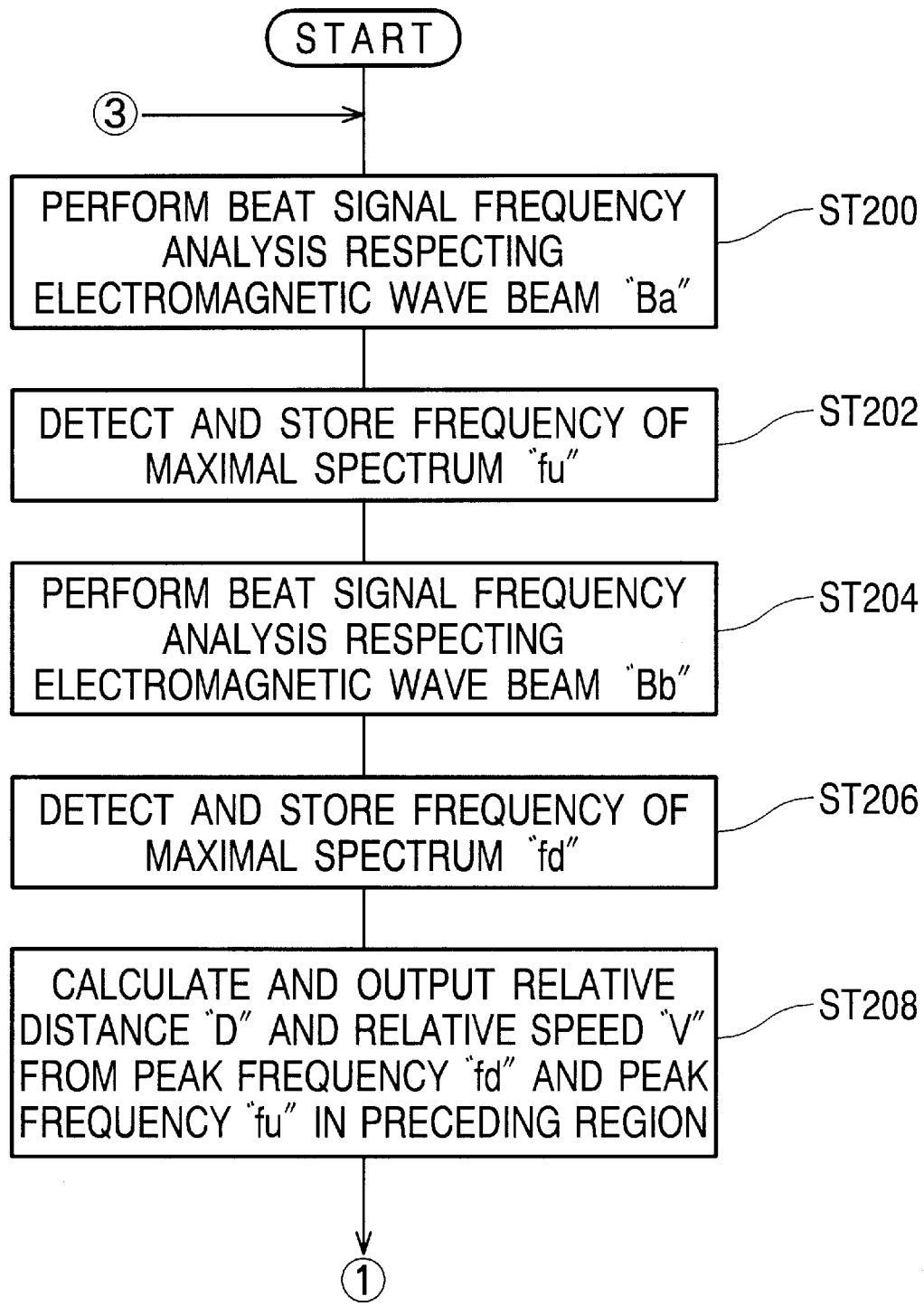
FIGS. 5A, 5B and 5C are flowcharts showing an important operation of the signal processing unit of FIG. 4.

In FIG. 5A, upon completion of the transmission of the electromagnetic wave beam Ba, the signal processing unit 12 firstly frequency analyzes the beat signal data relating to the electromagnetic wave beam Ba, stored in the memory 10 by the frequency analyzer 15 to obtain a spectrum distribution of the beat signal (ST 200). In this case, the frequency analyzer 15 obtains the spectrum distribution of the beat signal through the FFT.

By the maximal spectrum detector 16, the signal processing unit 12 detects, based on the spectrum data, a spectrum having a spectrum level of maximal value higher than a predetermined level (threshold) (hereinafter referred to as "maximal spectrum") (ST 202). Detection here is made, for example, with respect to spectra each having a spectrum level higher than the threshold and being on a increasing and decreasing trend to determine the maximal spectrum therebetween. The threshold is set to exclude noise components from the spectrum data of the beat signal.

The thus obtained maximal spectrum frequency is stored as a peak frequency in an internal memory of the signal processing unit 12 together with its spectrum level (ST 202), which is then output to an automatic driving control apparatus (not shown).

Upon completion of transmission of the electromagnetic wave beam Bb, the signal processing unit 12 performs a frequency analysis with respect to the beat signal data, stored in the memory 10, corresponding to the electromagnetic wave beam Bb, so as to provide a spectrum distribution of the beat signal (ST 204). Then, it detects a frequency of maximal spectrum (peak frequency) and a spectrum level thereof, and stores them in its internal memory (ST 206), whereafter it outputs the spectrum level to an automatic driving control apparatus (not shown).

From the internal memory, the distance/speed detector 18 of the signal processing unit 12 retrieves the peak frequency fu (up) in the frequency rise domain corresponding to the electromagnetic wave beam Ba and produces, through the Doppler shift calculation, the relative distance D and relative speed V with respect to the target A from the peak frequency fu and the peak frequency fd (down) in the frequency fall domain corresponding to the electromagnetic wave beam Bb (ST 208). The resulted relative distance D and relative speed V are fed to the automatic driving control apparatus (not shown).

Figure 5B:
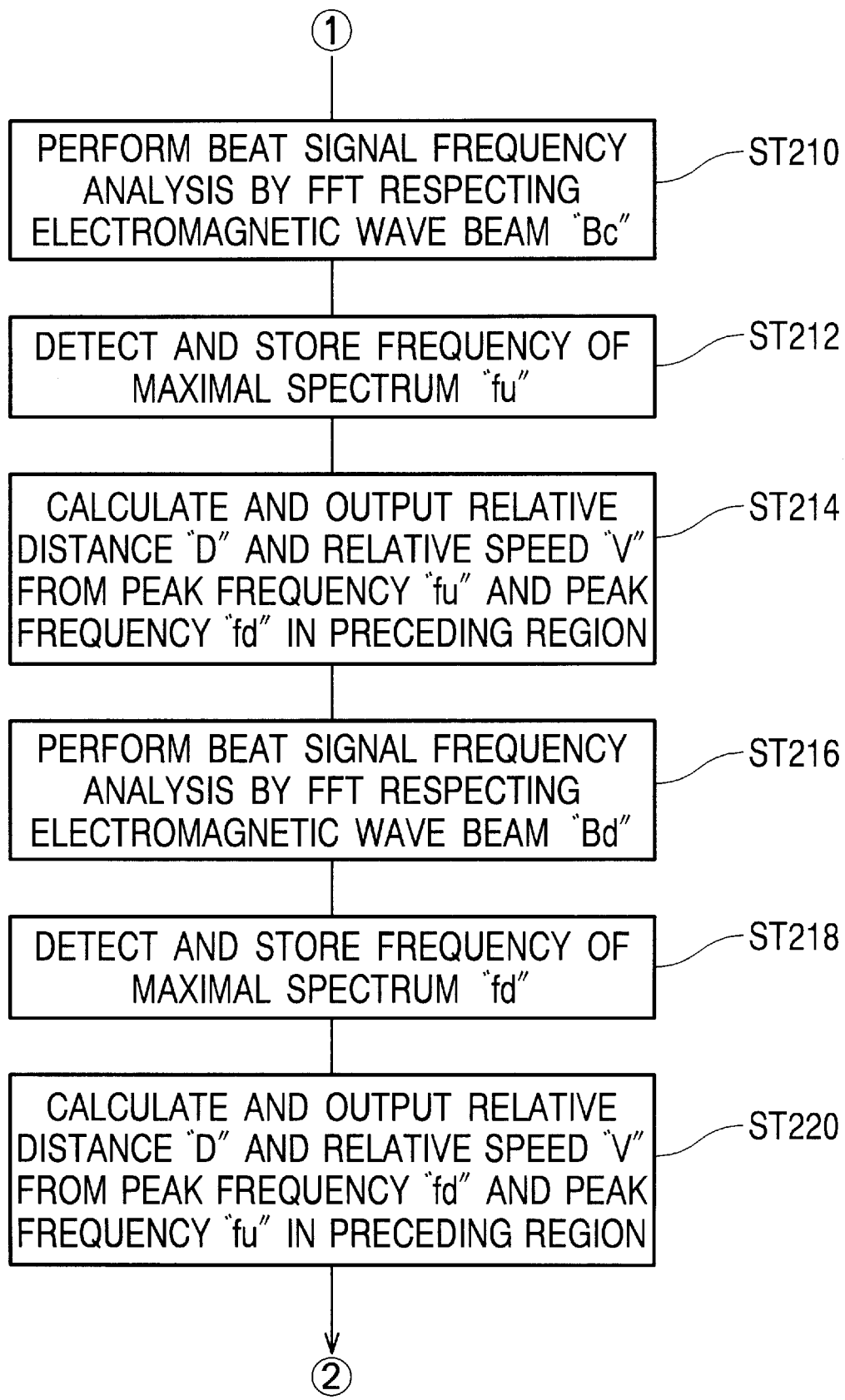

In FIG. 5B, upon completion of transmission of the electromagnetic wave beam Bc, the signal processing unit 12 performs a frequency analysis with respect to the beat signal data, stored in the memory 10, corresponding to the electromagnetic wave beam Bc so as to provide a spectrum distribution of the beat signal (ST 210). It then detects a frequency of maximal spectrum (peak frequency) and its spectrum level and stores them in its internal memory (ST 212), whereafter it outputs the spectrum level to the automatic driving control apparatus (not shown).

From the internal memory, the distance/speed detector 18 of the signal processing unit 12 retrieves the peak frequency fd (down) in the frequency fall region corresponding to the electromagnetic wave beam Bb, and produces, through the Doppler shift calculation, the relative distance D and relative speed V with respect to the target A from the peak frequency fd and the peak frequency fu (up) in the frequency rise region corresponding to the electromagnetic wave beam Bc (ST 214). The detected relative distance D and relative speed V are supplied to the automatic driving control apparatus (not shown).

Next, upon completion of transmission of the electromagnetic wave beam Bd, the signal processing unit 12 performs a frequency analysis with respect to the beat signal data, stored in the memory 10, corresponding to the electromagnetic wave beam Bd, so as to provide spectrum distribution of the beat signal (ST 216). Then, it detects a frequency of maximal spectrum (peak frequency) and its spectrum level, and stores them in its internal memory (ST 218), whereafter it outputs the spectrum level to the automatic driving control apparatus (not shown).

From the internal memory, the distance/speed detector 18 of the signal processing unit 12 retrieves the peak frequency fu (up) in the frequency rise region corresponding to the electromagnetic wave beam Bc, and produces, through the Doppler shift calculation, the relative distance D and relative speed V with respect to the target A from the peak frequency fu and the peak frequency fd (down) in the frequency fall region corresponding to the electromagnetic wave beam Bd (ST 220). The produced relative distance D and relative speed V are output to the automatic driving control apparatus (not shown).

Figure 5C:
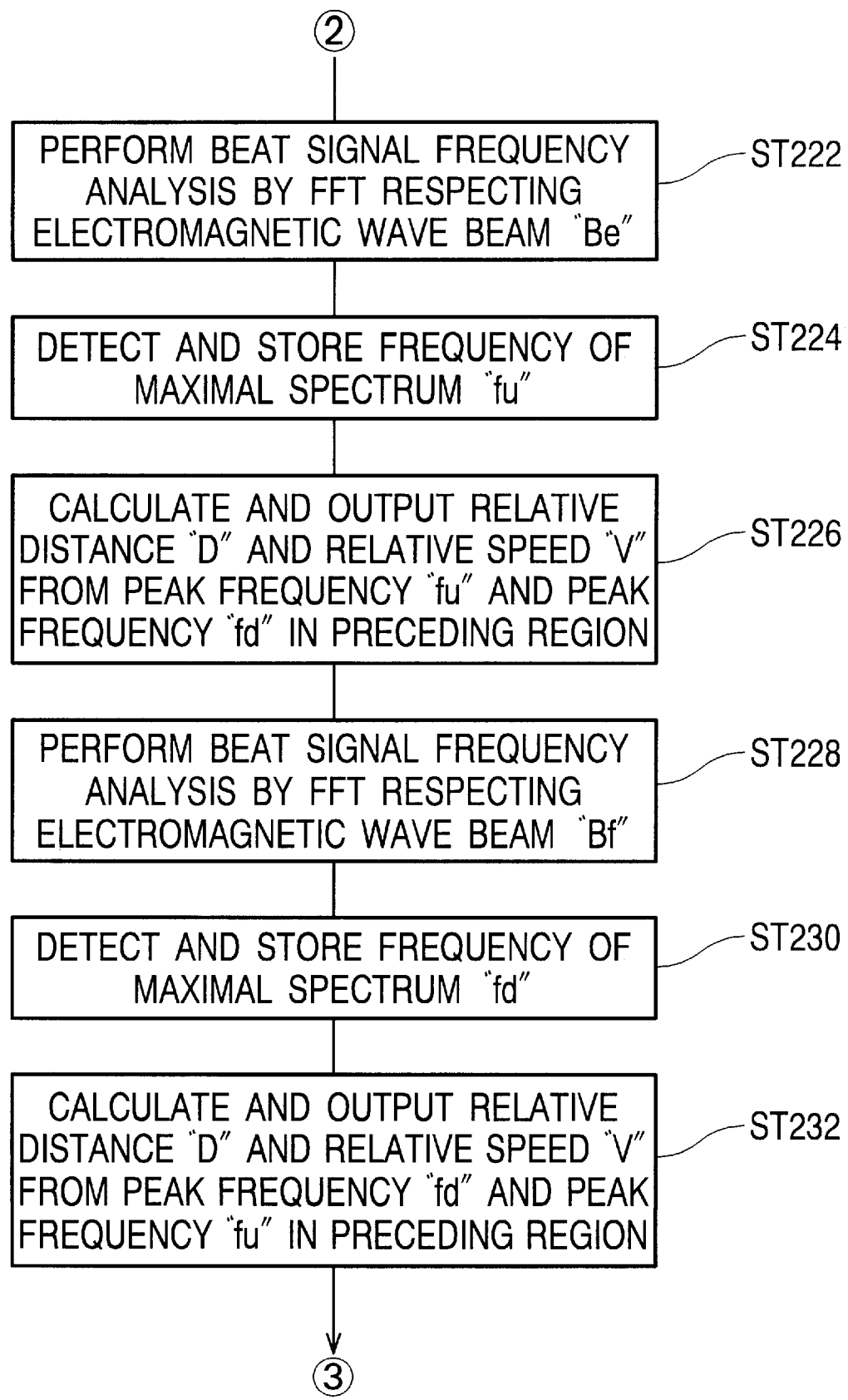

In FIG. 5C, upon completion of transmission of the electromagnetic wave beam Be, the signal processing unit 12 performs a frequency analysis with respect to the beat signal data, stored in the memory 10, corresponding to the electromagnetic wave beam Be, so as to provide a spectrum distribution of the beat signal (ST 222). Then, it detects a frequency of maximal spectrum (peak frequency) and its spectrum level, and stores them in its internal memory (ST 224). Thereafter, it outputs the spectrum level to the automatic driving control apparatus (not shown).

From the internal memory, the distance/speed detector 18 of the signal processing unit 12 retrieves the peak frequency fd (down) in the frequency fall region corresponding to the electromagnetic wave beam Bd, and produces, through the Doppler shift calculation, the relative distance D and relative speed V with respect to the target A from the peak frequency fd and the peak frequency fu (up) in the frequency rise region corresponding to the electromagnetic wave beam Be (ST 226). The detected relative distance D and relative speed V are fed to the automatic driving control apparatus (not shown).

Upon completion of transmission of the electromagnetic wave beam Bf, the signal processing unit 12 performs a frequency analysis with respect to beat signal data, stored in the memory 10, corresponding to the electromagnetic wave beam Bf, so as to provide a spectrum distribution of the beat signal (ST 228). Then, it detects a frequency of maximal spectrum (peak frequency) and its spectrum level, and stores them in its internal memory (ST 230), whereafter it outputs the spectrum level to the automatic driving control apparatus (not shown).

From the internal memory, the distance/speed detector 18 of the signal processing unit 12 retrieves the peak frequency fu (up) in the frequency rise region corresponding to the electromagnetic wave beam Be, and produces, through the Doppler shift calculation, the relative distance D and relative speed V from the peak frequency fu and the peak frequency fd (down) in the frequency fall region corresponding to the electromagnetic wave beam Bf (ST 232). Then, it outputs the detected relative distance D and relative speed V to the automatic driving control apparatus (not shown).

Thereafter, the described operation returns to ST 200 of FIG. 5A and is repeated periodically.

Figure 6A:
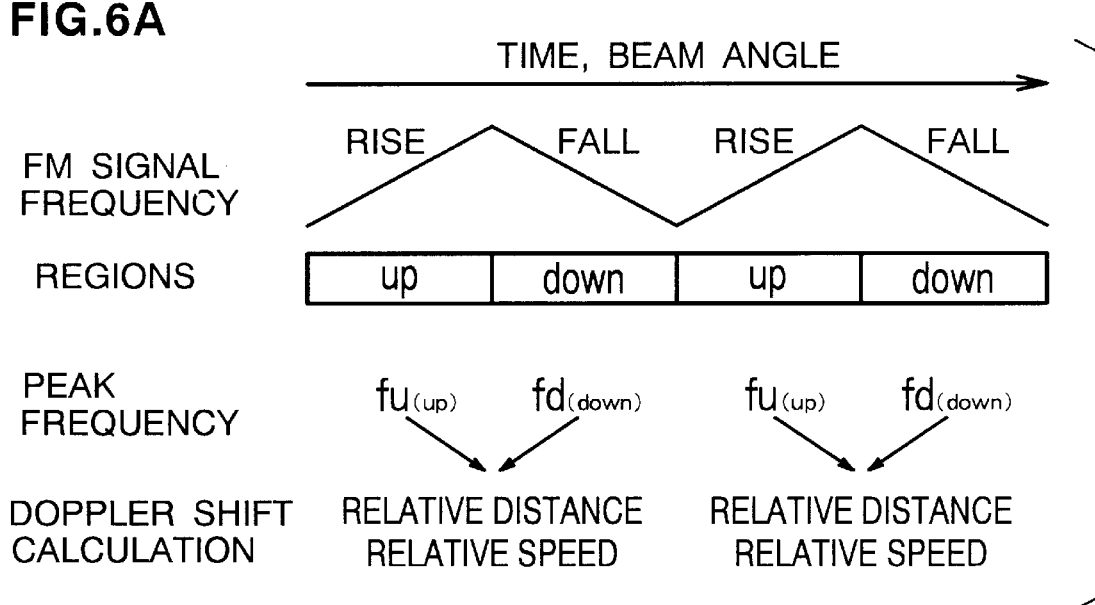
FIGS. 6A and 6B are explanatory views illustrating the operation of the inventive radar apparatus of FIG. 4, as compared to that of a conventional radar apparatus.
Figure 6B:
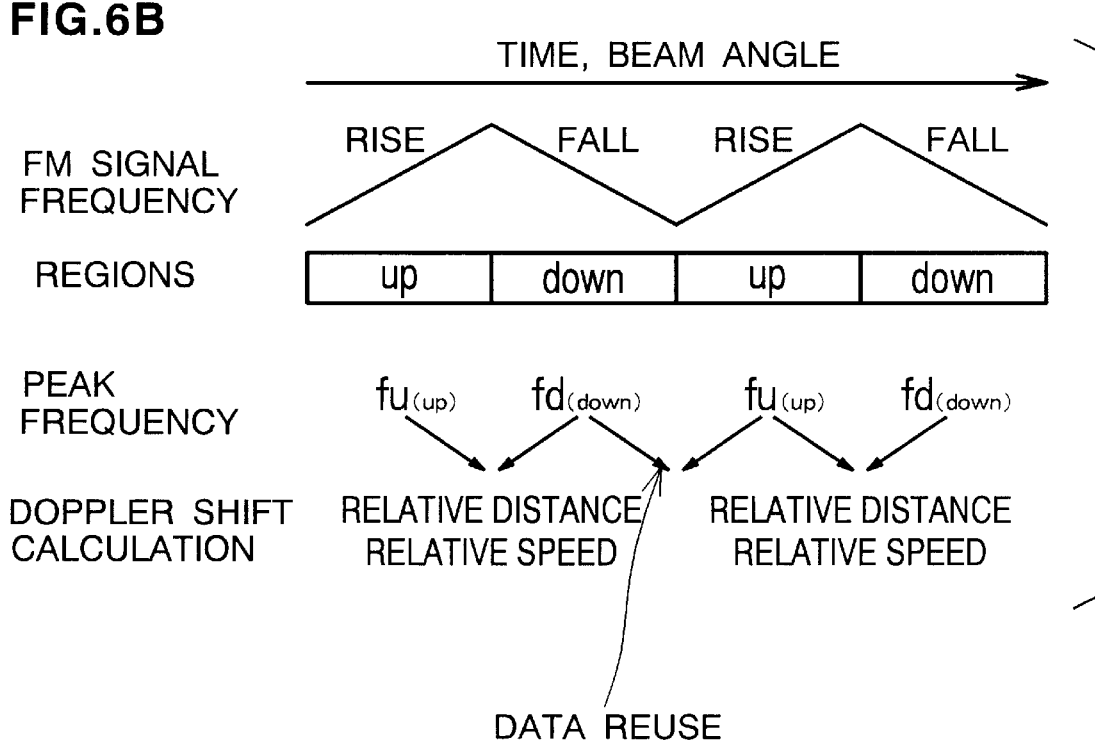

FIG. 6A illustrates an operation of a conventional FM radar apparatus, whilst FIG. 6B illustrates, in comparative fashion, one example of operation of the FM radar apparatus according to the embodiment of FIG. 4.

In the conventional FM radar apparatus of FIG. 6A, the relative distance D and relative speed V with respect to the target A are obtained through the Doppler shift calculation from the peak frequency fu (up) in the frequency rise region and the peak frequency fd (down) in the frequency fall region, and such detection process is repeated at each cycle of frequency sweep.

Similarly, in the inventive FM radar apparatus of FIG. 6B, the relative distance D and relative speed V with respect to the target A are obtained, through the Doppler shift calculation, from the peak frequency fu (up) in the frequency rise region and the peak frequency fd (down) in the frequency fall region. Thereafter, the relative distance D and relative speed V with respect to the target A are obtained, through the Doppler shift calculation, from the peak frequency fd (down) in the frequency fall region and the peak frequency fu (up) in the succeeding frequency rise region.

As can be appreciated from FIG. 6B, by detecting the relative distance D and relative speed V from the peak frequencies in one particular frequency rise or fall region and another frequency fall or rise region preceding it, it becomes possible to obtain target data during beam scanning at an accelerated pitch compared to the conventional FM radar apparatus. This also makes it possible to improve the bearing resolution without increasing beam scanning speed, frequency sweep speed and frequency modulation width and, in this respect, to detect the target A more finely and minutely.

Detection of peak frequencies by frequency analyzing the beat signal in each region is also practiced in the conventional FM radar apparatus. However, in the present invention, the peak frequency in any preceding region, rise or fall, is reused to save time and labor required in frequency analyzing the beat signal in the preceding or pairing region to obtain the peak frequency. As a result, it becomes possible to keep the increase of load, e.g., high speed operational processing associated with an accelerated pitch or rate of detection, to a minimum.

Figure 7A:
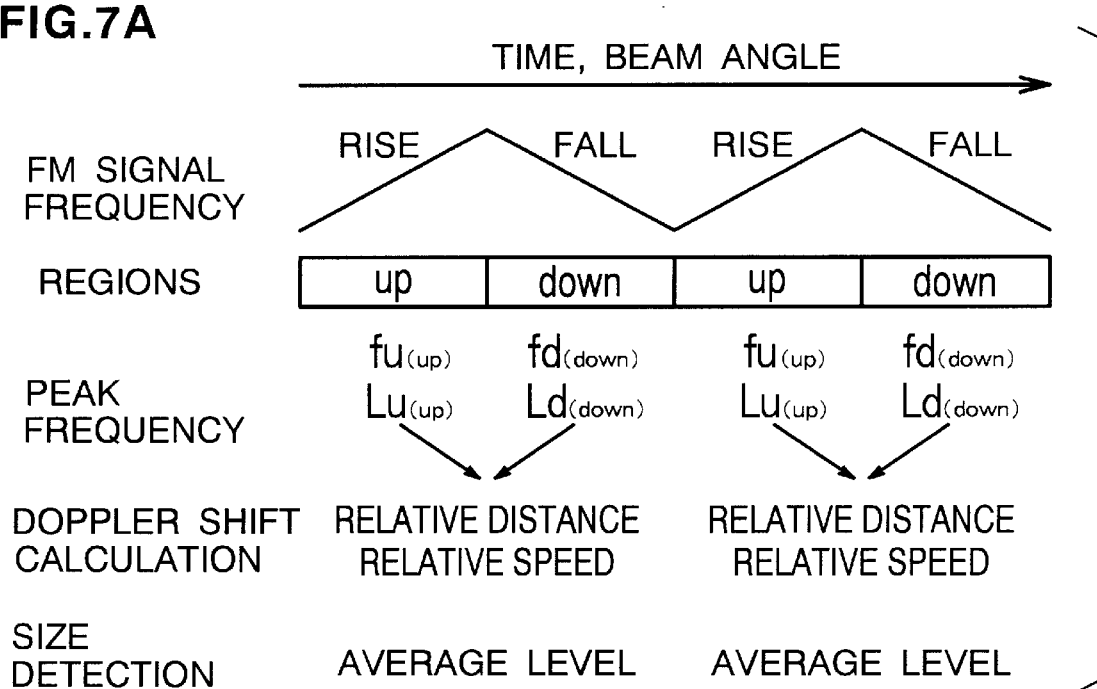
FIG. 7A illustrates an operation of an FM radar apparatus designed to detect the size of a target by obtaining a spectrum level average in peak frequencies between a frequency rise region and a frequency fall region, whilst
Figure 7B:
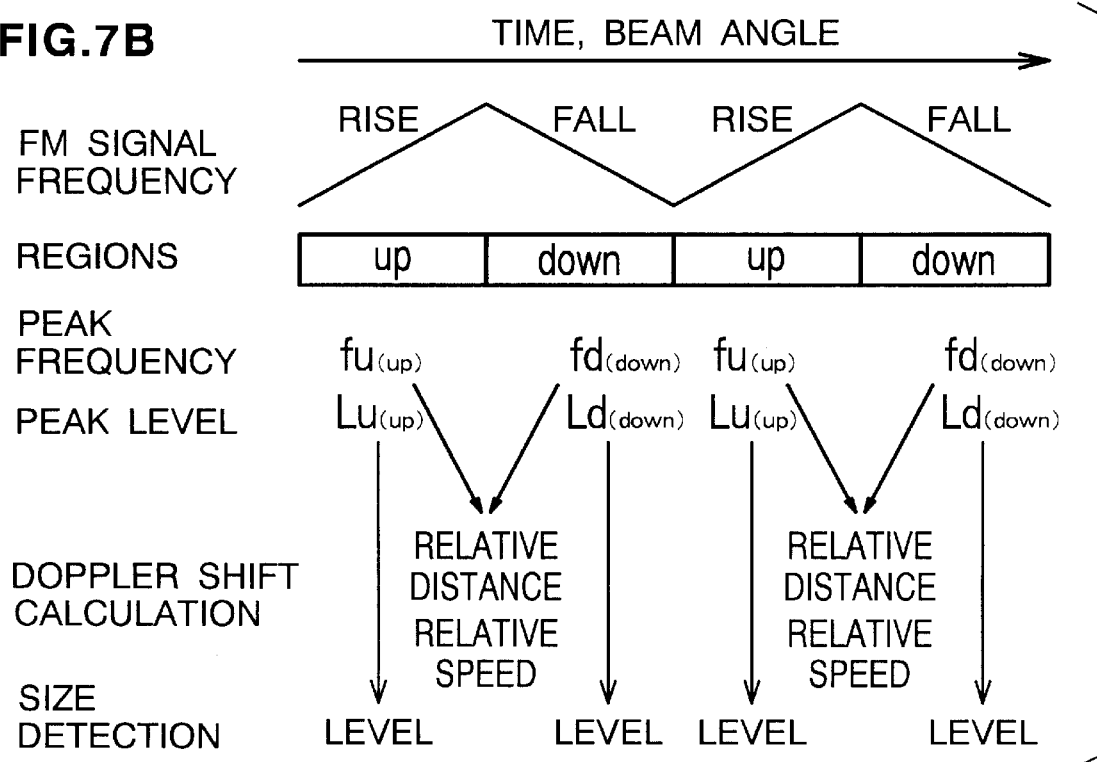
FIG. 7B illustrates a separate operation of a signal processing unit of the inventive FM radar apparatus, which is designed to detect the size of a target in each region from a spectrum level in a peak frequency in each region.

FIG. 7A shows for comparison an operation of a conventional FM radar apparatus while FIG. 7B shows a separate operation of the FM radar apparatus according to the embodiment of FIG. 4.

Figure 8A:
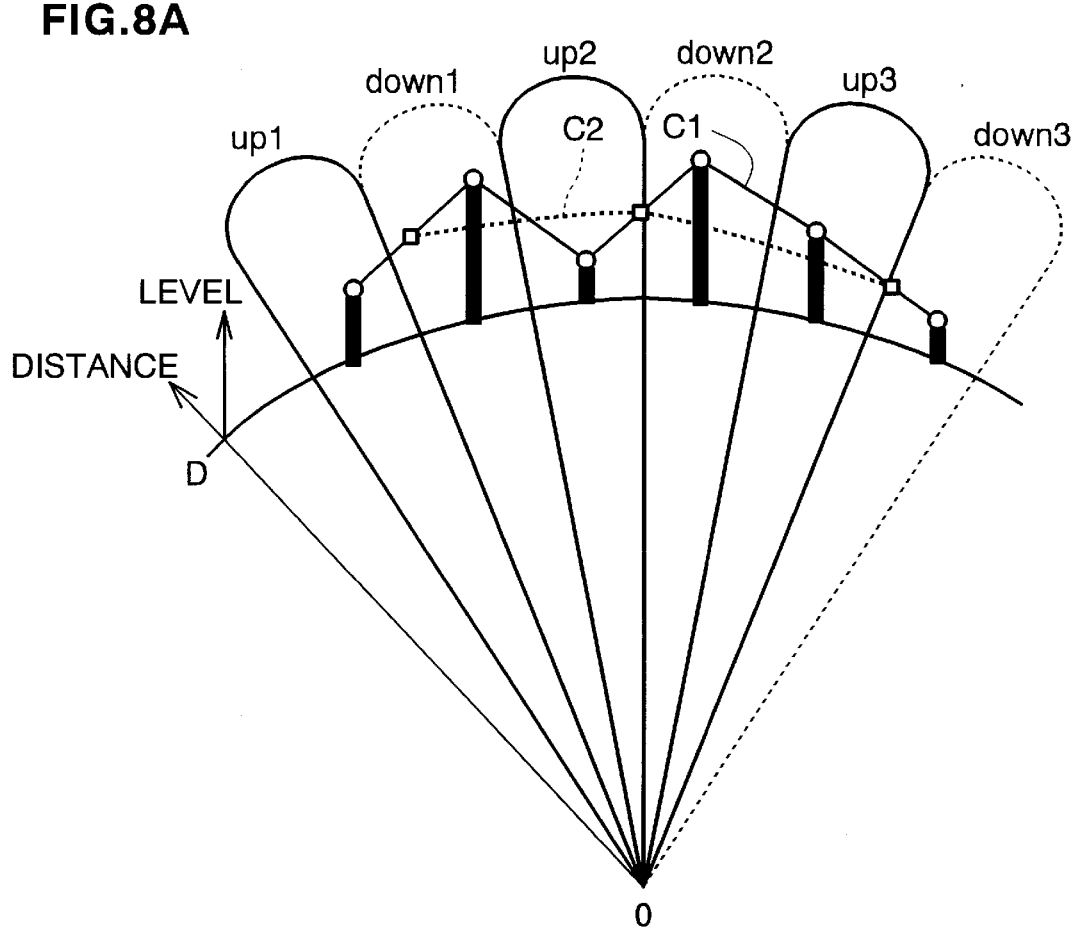
FIG. 8A is a columnar coordinate system illustrating the positions of antennas of the inventive FM radar apparatus, and the spectrum level in the direction of transmission of each beam, whilst
Figure 8B:
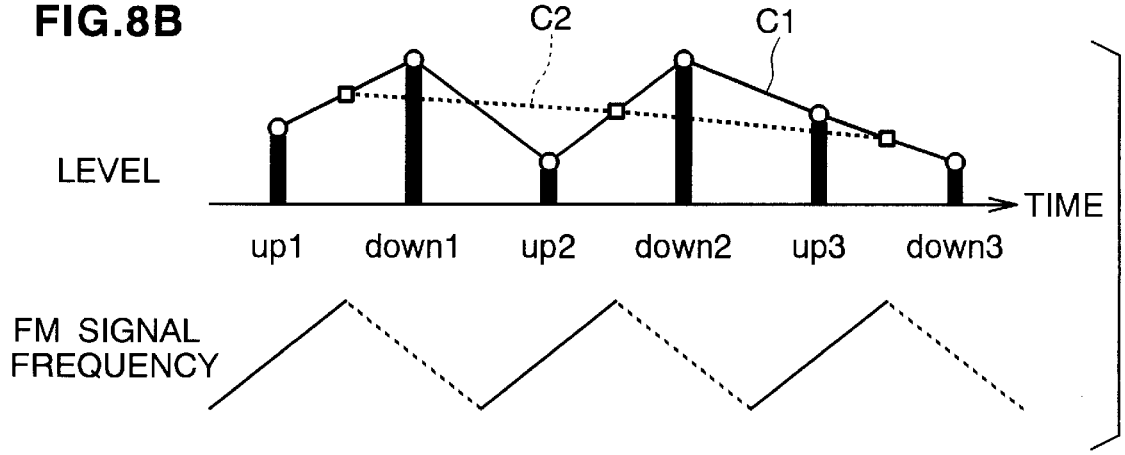
FIG. 8B illustrates a spectrum level of each region in correspondence with FIG. 8A.

FIG. 8A is a columnar coordinate system illustrating the antenna position 0 and spectrum levels in the direction of beam transmission. The spectrum levels are indicated in the heightwise direction of the figure. FIG. 8B depicts the spectrum levels in the respective regions such that they correspond to those of FIG. 8A.

Both FIG. 7A and FIG. 7B exemplify that detection is repeated at each cycle of frequency sweep to obtain the relative distance D and relative speed V with respect to the target A through the Doppler shift calculation from the peak frequency fu (up) in the frequency rise region and the peak frequency fd (down) in the frequency fall region.

Relative to FIG. 7B, it may also be arranged such that the relative distance D and relative speed V with respect to the target A are detected in each region as in the case of FIG. 6B. In this instance, the electromagnetic beams up1, down1, up2, down2, up3, down3 shown in FIG. 8A correspond respectively to the electromagnetic beams Ba, Bb, Bc, Bd, Be, Bf (see FIG. 4).

Figure 9B:
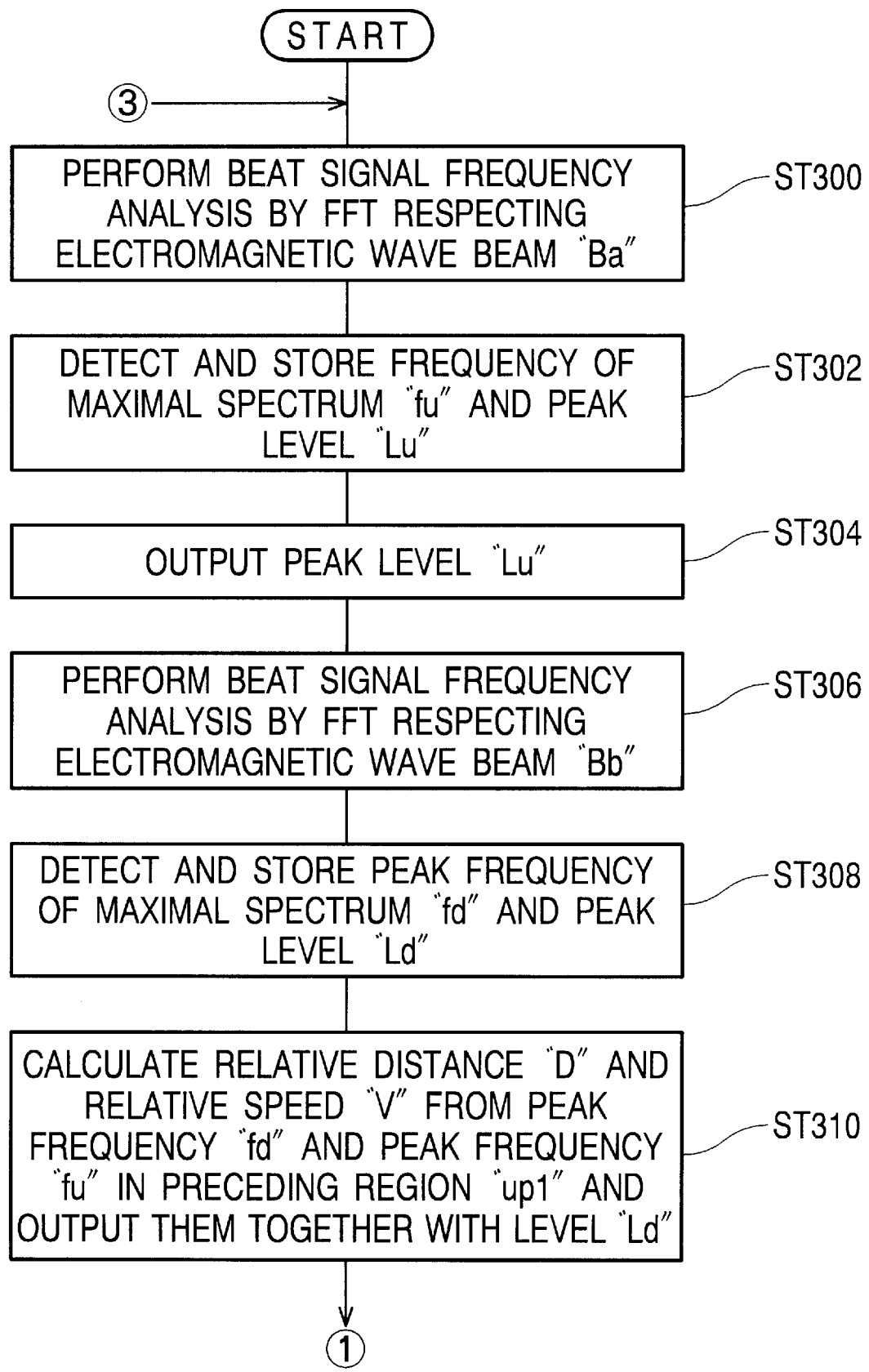
Figure 9B:
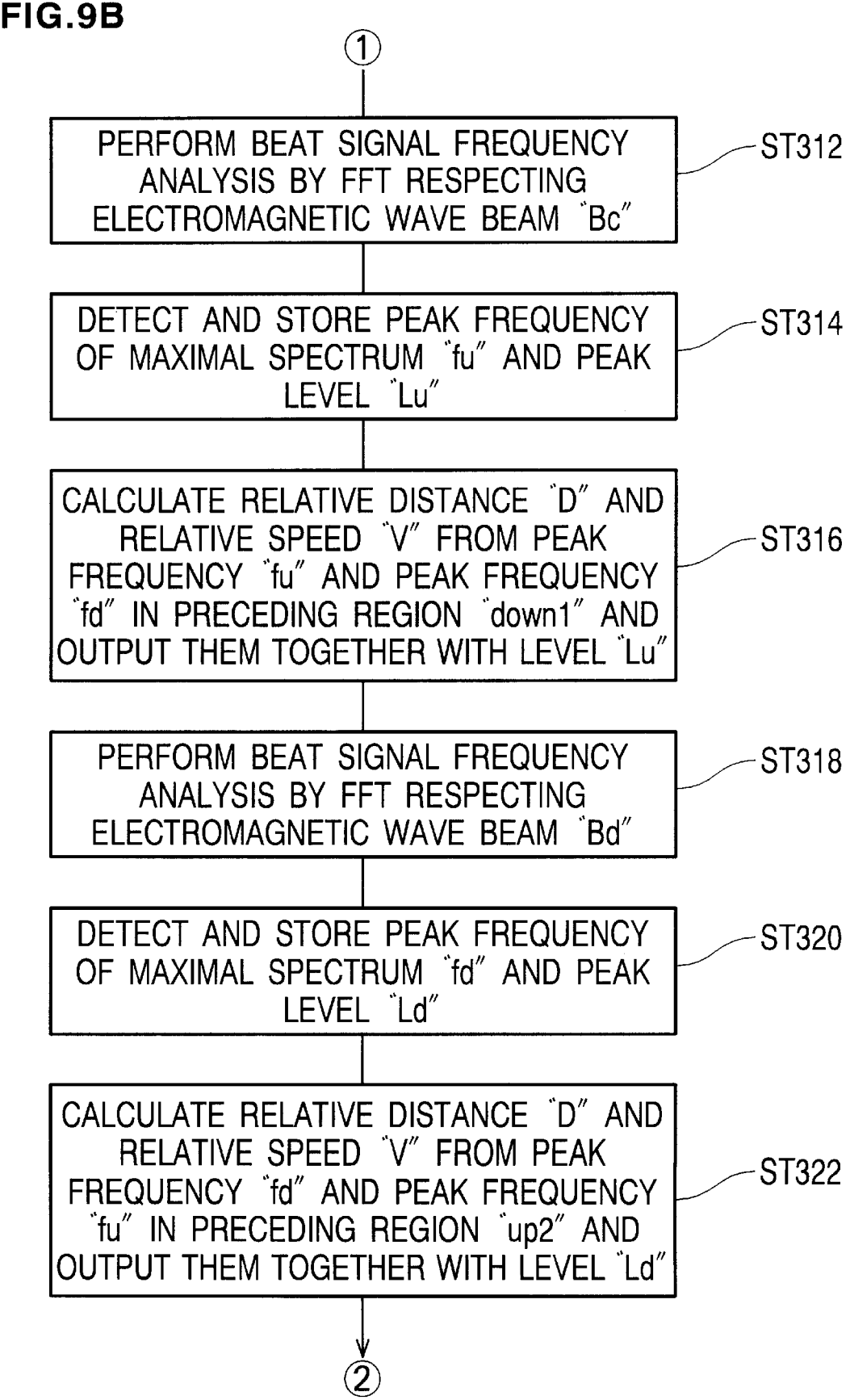
Figure 9C:
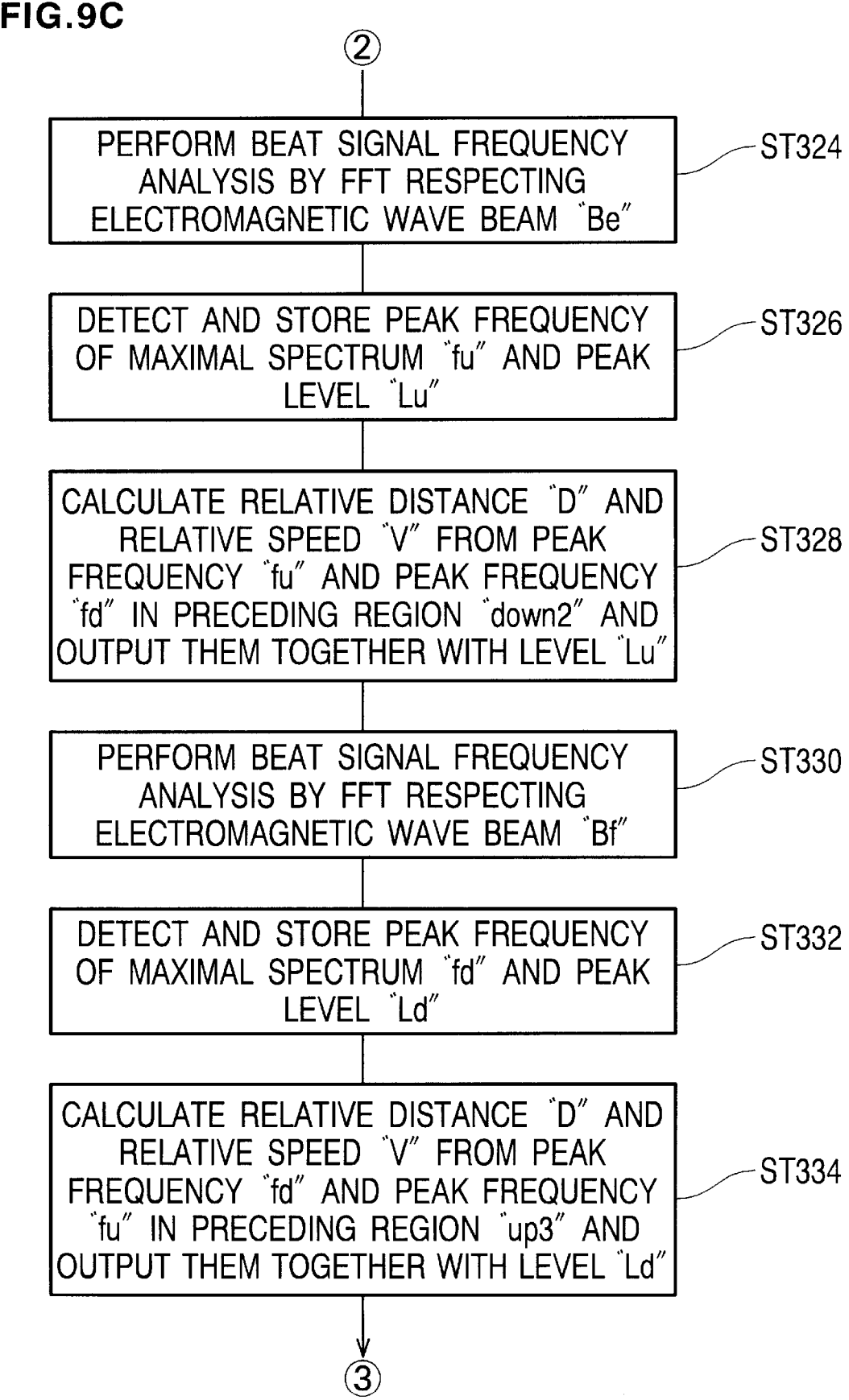

In a more detailed discussion with reference to the flowcharts of FIG. 9A–FIG. 9C, the signal processing unit 12 shown in FIG. 4 performs a frequency analysis with respect to the data of the beat signal corresponding to the electromagnetic wave beam Ba to obtain a spectrum distribution (ST 300) and detects and stores the frequency of maximal spectrum fu in the respective frequency rise region and its peak level Lu (ST 302). It then outputs the peak level Lu (ST 304). Next, the signal processing unit 12 performs a frequency analysis on the data of the beat signal corresponding to the electromagnetic wave beam Bb to obtain a spectrum distribution (ST 306), detects and stores the frequency of maximal spectrum fd in the respective frequency fall region and its spectrum level Ld (ST 308), works out the relative distance D and relative speed V from the peak frequency fd and the peak frequency fu in the immediately preceding region up1, and then outputs them along with the peak level Ld 8ST 310).

As seen from FIG. 9B, the signal processing unit 12 also gives the same processing as in ST 300 and ST 302 of FIG. 9A to the electromagnetic wave beam Bc (ST 312, ST 314), detects the relative distance D and relative speed V from the peak frequency fu and the peak frequency fd in the immediately preceding region down1, and then outputs them along with the peak level Lu (ST 316). Additionally, the signal processing unit 12 gives the same processing as in ST 306 and ST 308 to the electromagnetic wave beam Bd (ST 318, ST 320), works out the relative distance D and relative speed V from the peak frequency fd and the peak frequency fu in the immediately preceding region up2, and then outputs them along with the peak level Ld (ST 322).

Turning now to FIG. 9C, the signal processing unit 12 gives the same processing as in ST 300 and ST 302 of FIG. 9A to the electromagnetic wave beam Be (ST 324), ST 326), works out the relative distance D and relative speed V from the peak frequency fu and the peak frequency fd in the immediately preceding region down2, and then outputs them together with the peak level Lu (ST 328). Next, the signal processing unit 12 gives the same processing as in ST 306 and ST 308 of FIG. 9A to the electromagnetic wave beam Bf (ST 330, ST 332), works out the relative distance D and relative speed V from the peak frequency Fd and the peak frequency Fu in the immediately preceding region up3, and then outputs them together with the peal level Ld (ST 334).

Thereafter, the detection process returns to ST 300 of FIG. 9A so that the described operation may be repeated periodically.

In the conventional FM radar apparatus of FIG. 7A, the size of the target A is detected by obtaining a mean value, (Lu+Ld)/2, of the spectrum levels in the peak frequencies in the respective regions, and this size detection is repeated at each cycle of frequency sweep. Such arrangement allows the provision of a spectrum level average as shown by ○ in FIG. 8A and FIG. 8B. When these ○ are connected by a dotted line, there is provided a curved line C2.

In the FM radar apparatus according to the present embodiment shown in FIG. 7B, the target size in each region is detected from the spectrum levels Lu, Ld in peak frequencies in the respective regions. That is, the target size in each direction of beam transmission is detected. In the inventive FM radar apparatus, spectrum levels as shown by ○ in Fig. FIG. 8A and FIG. 8B are obtained. When these ○ are connected by a dotted line, a curved line C1 is provided. The curved line C1 represents, for example, a motorcycle with a sidecar.

As explained above, the FM radar apparatus according to the present embodiment is arranged such that the directions of beam transmission are switched upon shift from one region to another and the size of a target in the directions of beam transmission is detected from spectrum levels in the peak frequencies of the beat signals in the respective regions. This arrangement allows for finer or more accurate detection of the target configuration compared to the conventional FM radar apparatus in which the target size is detected from an average value of spectrum levels at each cycle of frequency sweep as shown in FIG. 5A.

In the FM radar apparatus according to the embodiment of FIG. 4, the switching device 19 may also be arranged such that by switching it at each cycle of frequency sweep, the directions of beam transmission are switched upon shift from a frequency rise region of the FM signal to a succeeding frequency fall region. In this instance, as attention is drawn to the frequency rise region and the frequency fall region sandwitching the time of switching of the directions of beam transmission, it may be appreciated that the relative distance D and relative speed V with respect to the target A located across the directions of transmission of both beams can be detected through the Doppler shift calculation. As a result, it becomes possible to obtain target data at an accelerated pitch compared to the conventional process.

This further leads to the advantage that the bearing resolution can be improved without increasing the angular velocity of scan directions and frequency sweep speed. In other words, such arrangement is possible that can transmit beams in a central direction relative to the directions of transmission of both beams upon shift from the frequency rise region to the frequency fall region. The same may be applied to the arrangement in which the directions of beam transmission are switched at each cycle of frequency sweep upon shifting from the frequency fall region of the FM signal to the frequency rise region.

In relation to the foregoing embodiments, discussion has been made as to the use of the FFT in frequency analyzing beat signals. Alternatively, the frequency analysis may be performed, for example, by a band-pass filter (BPF).

In the FM radar apparatus according to the embodiment of FIG. 1, where rotation of the motor 20 is stopped and the antenna 3 is turned into a predetermined direction, detection and redetection of the relative distance D to the target A may be repeated so that the relative distance D to the target A oriented in the predetermined direction can be obtained at an accelerated pitch.

Cycle of rotation (head swing) of the antenna 3 of FIG. 3 may be set to be several times the frequency sweep cycle. In addition, an arrangement may be made which detects orientations of the antenna 3 and outputs the results to the automatic driving apparatus (not shown).

In applying the present invention to detection of a plurality of targets A, reference may be had to Japanese Patent Laid-Open Publications No. HEI 5-142337 and No. HEI 5-150035.

As thus far explained in detail, the FM radar apparatus according to the present invention not only can detect a target finely and minutely by use of the regions in an overlapped fashion but also can detect the relative distance and speed with respect to and the size of the target at an accelerated pitch compared to the conventional radar apparatus. As a result, the inventive radar apparatus is imparted improved response capability in the control of vehicle-to-vehicle driving and the detection of obstacles. Further, a moving object carrying the FM radar apparatus in accordance with the present invention can produce appropriate warnings.

Obviously, various minor changes and modifications of the present invention are possible in the light of the above teaching. It is therefore to be understood that within the scope of the appended claims, the present invention may be practiced otherwise than as specifically described.

What is claimed is:

1. An FM radar apparatus for transmitting an FM signal at a target, receiving a reflected signal from the target and detecting the target based on a beat signal obtained by mixing the received signal with a signal relating to the transmitted signal, said FM radar apparatus comprising:

a detector for detecting at least one of a distance to and a speed of the target from peak frequencies of beat signals in a frequency rise region and a succeeding frequency fall region of said FM signal; and a separate detector for redetecting at least one of said distance and said speed from said peak frequency in said frequency fall region and a peak frequency of a beat signal in a succeeding frequency rise region of said FM signal.

2. An FM radar apparatus according to claim 1, wherein said FM radar apparatus transmits sequentially beams of said FM signal in a plurality of directions lying proximately to each other, receives reflected signals from said target located in said directions of beam transmission, and detects said target based on a beat signal obtained by mixing said received signal with a signal relating to said transmitted signal.

3. An FM radar apparatus according to claim 2, wherein said FM radar apparatus allows for switching of the directions of beam transmission either upon shifting from said frequency rise region to a succeeding frequency fall region of said FM signal or upon shifting from said frequency fall region to a succeeding frequency rise region of said FM signal.

4. An FM radar apparatus according to claim 2, wherein said FM radar apparatus allows for switching of the directions of beam transmission upon shifting from said frequency rise region to a succeeding frequency fall region of said FM signal and upon shifting from said frequency fall region to a succeeding frequency rise region of said FM signal, and wherein said FM radar apparatus includes a size detector for detecting the size of said target in the directions of beam transmission, from a spectrum level in said peak frequency of said beat signal in each of said regions.

5. An FM radar apparatus according to claim 1, wherein said FM radar apparatus comprises an FM-CW radar for transmitting an FM signal frequency modulated by a triangular wave.

6. An FM radar apparatus for transmitting an FM signal at a target, receiving a reflected signal from the target and detecting the target based on a beat signal obtained by mixing the received signal with a signal relating to the transmitted signal, said FM radar apparatus comprising:

a detector for detecting at least one of a distance to and a speed of the target from peak frequencies of beat signals in a frequency fall region and a succeeding frequency rise region of said FM signal; and a separate detector for redetecting at least one of said distance and said speed from said peak frequency of the beat signal in said frequency rise region and a peak frequency of a beat signal in a succeeding frequency fall region of said FM signal.

7. An FM radar apparatus according to claim 6, wherein said FM radar apparatus sequentially transmits beams of said FM signal in a plurality of directions lying proximately to each other, receives reflected signals from said target located in said directions of beam transmission, and detects said target based on a beat signal obtained by mixing said received signal with a signal relating to said transmitted signal.

8. An FM radar apparatus according to claim 7, wherein said FM radar apparatus allows for switching of the directions of beam transmission either upon shifting from said frequency rise region to a succeeding frequency fall region of said FM signal or upon shifting from said frequency fall region to a succeeding frequency rise region of said FM signal.

9. An FM radar apparatus according to claim 7, wherein said FM radar apparatus allows for switching of the directions of beam transmission upon shifting from said frequency rise region to a succeeding frequency fall region of said FM signal and upon shifting from said frequency fall region to a succeeding frequency rise region of said FM signal, and includes a size detector for detecting the size of said target in the directions of beam transmission, from a spectrum level in said peak frequency of said beat signal in each of said regions.

10. An FM radar apparatus according to claim 6, wherein said FM radar apparatus comprises an FM-CW radar apparatus for transmitting an FM signal frequency modulated by a triangular wave.

11. An FM radar apparatus for sequentially transmitting beams of an FM signal in a plurality of directions lying proximately to each other, receiving a reflected signal from a target located in the directions of beam trans-mission, and detecting the target based on a beat signal obtained by mixing the received signal with a signal relating to the transmitted signal, wherein said FM radar apparatus allows for switching of the directions of beam transmission upon shifting from said frequency rise region to a succeeding frequency fall region of said FM signal and upon shifting from said frequency fall region to a succeeding frequency rise region of said FM signal, and includes a size detector for detecting the size of said target in the directions of beam transmission, from a spectrum level in said peak frequency of said beat signal in each of said regions.

12. A method for detecting a target, comprising the steps of:

transmitting an FM signal at the target;

receiving a reflected signal from the target;

mixing said received signal with a signal relating to said transmitted signal to provide a beat signal;

detecting at least one of a relative distance to and a relative speed of the target from a peak frequency of said beat signal in a frequency rise region and a succeeding frequency fall region of said FM signal; and redetecting at least one of said relative distance to and said relative speed of said target from said peak frequency of said beat signal in said frequency fall region and a peak frequency of a beat signal in a succeeding frequency rise region.

13. An FM radar apparatus for transmitting an FM signal at a target, receiving a reflected signal from the target and detecting the target based on a beat signal obtained by mixing the received signal with a signal relating to the transmitted signal, said FM radar apparatus comprising:

a detector system for (1) detecting at least one of a distance to and a speed of the target from peak frequencies of beat signals in a frequency rise region and a succeeding frequency fall region of said FM signal, and (2) redetecting at least one of said distance and said speed from said peak frequency in said frequency fall region and a peak frequency of a beat signal in a succeeding frequency rise region of said FM signal.

14. An FM radar apparatus according to claim 13 wherein the detector system comprises two separate detectors.

* * * * *

UNITED STATES PATENT AND TRADEMARK OFFICE
CERTIFICATE OF CORRECTION

PATENT NO   :   5,905,458
DATED       :   May 18, 1999
INVENTOR(S) :   Jun Ashihara It is certified that error appears in the above-identified patent and that said Letters Patent is hereby corrected as shown below:

Column 1, line, 64, please change "lest" to -- least --.

Column 4, line 66, after "denotes," please delete "is."

Column 5, line 46, please delete the second "the."

Column 6, line 49, please change "Fourie" to -- Fourier --.

Column 6, line 61, please change "spectrum" to -- spectrum") --.

Column 7, line 21, please change "store" to -- stored --.

Column 9, line 62, please change "a" to -- an --.

Column 9, lines 63-64 please change the hyphenation of "ther-ebetween" to -- there-between --.

Column 12, line 61, please change "8ST310)" to -- (ST310) --.

Column 13, line 10, please delete the ")" after ST324.

Column 13, line 20, please change "peal" to -- peak --.

UNITED STATES PATENT AND TRADEMARK OFFICE
CERTIFICATE OF CORRECTION

PATENT NO : 5,905,458
DATED : May 18, 1999
INVENTOR(S) : Jun Ashihara

It is certified that error appears in the above-identified patent and that said Letters Patent is hereby corrected as shown below:

Column 13, lines 29 and 30, please change "O" to -- □ --.

Column 13, line 61, please change "sandwitching" to -- sandwiching --.

Column 14, line 29, please change "had to" to -- made --.

Column 14, line 38, please change "is" to -- has --.

Column 16, line 14, please change "trans-mission" to -- transmission --.

Signed and Sealed this

Eighth Day of February, 2000

*Attest:*

Q. TODD DICKINSON

*Attesting Officer*     *Commissioner of Patents and Trademarks*